United States Patent
Gan et al.

(10) Patent No.: US 8,787,214 B2
(45) Date of Patent: Jul. 22, 2014

(54) METHOD AND ARRANGEMENT IN A WIRELESS COMMUNICATION NETWORK

(75) Inventors: Jiansong Gan, Beijing (CN); Niklas Johansson, Sollentuna (SE); Yin Liu, Beijing (CN); Qingyu Miao, Beijing (CN); Peter Moberg, Stockholm (SE); Hai Wang, Beijing (CN)

(73) Assignee: Telefonaktiebolaget L M Ericcson (Publ), Stockholm (SE)

( * ) Notice: Subject to any disclaimer, the term of this patent is extended or adjusted under 35 U.S.C. 154(b) by 2 days.

(21) Appl. No.: 13/123,594

(22) PCT Filed: May 25, 2010

(86) PCT No.: PCT/CN2010/000741
§ 371 (c)(1),
(2), (4) Date: Aug. 2, 2011

(87) PCT Pub. No.: WO2011/147045
PCT Pub. Date: Dec. 1, 2011

(65) Prior Publication Data
US 2011/0292843 A1    Dec. 1, 2011

(51) Int. Cl.
*H04B 7/00*        (2006.01)

(52) U.S. Cl.
USPC .......................................................... 370/277

(58) Field of Classification Search
USPC ...................... 370/293, 329, 277; 455/78, 23;
343/700 MS
See application file for complete search history.

(56) References Cited

U.S. PATENT DOCUMENTS

| | | | |
|---|---|---|---|
| 5,880,695 A * | 3/1999 | Brown et al. ........... 343/700 MS |
| 7,957,702 B2 * | 6/2011 | Haartsen et al. ................ 455/78 |
| 8,331,271 B2 * | 12/2012 | Kim et al. ...................... 370/293 |
| 2008/0008126 A1 * | 1/2008 | Shirakabe et al. ............ 370/329 |
| 2008/0153431 A1 | 6/2008 | Haartsen et al. |
| 2009/0213765 A1 | 8/2009 | Rinne et al. |
| 2009/0285147 A1 | 11/2009 | Subasic et al. |
| 2011/0143658 A1 * | 6/2011 | Hanson et al. .................. 455/23 |

FOREIGN PATENT DOCUMENTS

| CN | 101151812 A | 3/2008 |
|---|---|---|
| WO | 2010/030139 A2 | 3/2010 |

OTHER PUBLICATIONS

PCT International Search Report, mailed Mar. 10, 2011, in connection with International Application No. PCT/CN10/00741.
PCT Written Opinion, mailed Mar. 10, 2011, in connection with International Application No. PCT/CN10/00741.
(Continued)

*Primary Examiner* — Mark Rinehart
*Assistant Examiner* — Gbemileke Onamuti
(74) *Attorney, Agent, or Firm* — Patent Portfolio Builders PLLC

(57) ABSTRACT

Method and arrangement in a relay node, for selecting communication mode. The relay node is configured to communicate with a base station via a donor antenna over a first link and to communicate with a user equipment via a coverage antenna over a second link. The method comprises obtaining an isolation value, based on the radio wave isolation between the relay donor antenna and the relay coverage antenna. The obtained isolation value is compared with an isolation threshold level value. The relay node is configured to communicate in full duplex mode if the obtained isolation value exceeds the isolation threshold level value, otherwise in half duplex mode. Information concerning the configured duplex mode of the relay node is transmitted to the base station.
Also a method and arrangement in a base station is described.

17 Claims, 9 Drawing Sheets

(56) References Cited

OTHER PUBLICATIONS

3GPP TSG RAN WG1 Meeting #60, R1-101197, "Full duplex multiplexing of Un and Uu subframes", Feb. 16, 2010.

3GPP TSG RAN WG1 Meeting #60, R1-101659, "Text proposal on inband full duplex relay for TR 36.814", Mar. 1, 2010.

Russian Federation Patent Office, Official Action in Appl. No. 2012156131/07, Jan. 29, 2014.

* cited by examiner

METHOD AND ARRANGEMENT IN A WIRELESS COMMUNICATION NETWORK

TECHNICAL FIELD

The present invention relates to a method and arrangement in a relay node and to a method and arrangement in a base station. More in particular, the present invention relates to a mechanism for selecting communication mode in the relay node.

BACKGROUND

Relaying is being considered e.g. for Long Term Evolution (LTE) Release 10, as a tool to improve the coverage of high data rates, group mobility, temporary network deployment, the cell-edge throughput and/or to provide coverage in new areas. At least type-1 relay nodes are part of LTE-Advanced, and a type-1 relay is an inband relaying node (RN), characterized by a serial of characteristics, e.g. having its own physical cell ID, appearing as a Rel-8 eNB to Rel-8 user equipments (UEs) etc.

It is generally assumed in 3rd Generation Partnership Project (3GPP), which the LTE endeavourments form part of, that the transmission from any antenna of a relaying node may cause severe interference to the reception of the other antenna, see FIG. 1A and FIG. 1B, respectively. In order not to set strict requirements to user equipments and network deployment, 3GPP assumes that Un, i.e. the radio link between the base station (eNB) and the relaying node (RN), and Uu, i.e. the radio link between the relaying node (RN) and the user equipment (UE), of the same relaying node, are operated in different time.

Thus in the radio link from the base station (eNB) to the relaying node (RN), and the radio link from the relaying node (RN) to the user equipment (UE) are time division multiplexed in a single frequency band. Thereby only one of these links is active at any time, in order not to cause interference on the other.

The same applies also in the uplink, such that the radio link from the relaying node (RN) to the base station (eNB), and the radio link from the user equipment (UE) to the relaying node (RN) are time division multiplexed in a single frequency band. Thereby only one of these links is active at any time.

In this way, the relaying node defined in 3GPP can only work in half-duplex mode. When operating in half-duplex mode, communication is possible in both directions i.e. from the user equipment via the relaying node to the base station, but only in one direction at a time, not simultaneously. Typically, once a node begins receiving a signal, it must wait for the transmitter of the transmitting node to stop transmitting, before replying.

Though network deployment efforts and hardware requirements may not be a problem for type-I relay, such a half-duplex mechanism leads to undesirable performance loss, as resources have to be partitioned between Un and Uu.

Thus the over all transmission performance is suffering, in comparison with transmission in full duplex mode, which allows communication in both directions simultaneously.

Another problem with the known solution for avoiding self interference at the relaying node is that the time partitioning creates a delay of the transmission, which prolongs the over all transmission time.

SUMMARY

It is an object of the present invention to obviate at least some of the above mentioned disadvantages and to provide a mechanism for improving the performance within a wireless communication network.

According to a first aspect, the object is achieved by a method in a relay node for selecting communication mode. The relay node is configured to communicate with a base station via a donor antenna over a first link. Further, the relay node is also configured to communicate with a user equipment via a coverage antenna over a second link. The method comprises obtaining an isolation value, based on the radio wave isolation between the relay donor antenna and the relay coverage antenna. The obtained isolation value is compared with an isolation threshold level value. The relay node is then configured to communicate in full duplex mode if the obtained isolation value exceeds the isolation threshold level value, otherwise in half duplex mode. Information concerning the configured duplex mode of the relay node is transmitted to the base station.

According to a second aspect, the object is also achieved by an arrangement in a relay node for selecting communication mode. The relay node is configured to communicate with a base station via a donor antenna over a first link. Further, the relay node is also configured to communicate with a user equipment via a coverage antenna over a second link. The arrangement comprises an obtaining unit. The obtaining unit is adapted to obtain an isolation value, based on the radio wave isolation between the relay donor antenna and the relay coverage antenna. Also, the arrangement comprises a comparison unit. The comparison unit is adapted to compare the obtained isolation value with an isolation threshold level value. Further, the arrangement comprises a configuration unit. The configuration unit is adapted to configure the relay node to communicate in full duplex mode if the obtained isolation value exceeds the isolation threshold level value, otherwise in half duplex mode. In addition, the arrangement comprises a transmission unit. The transmission unit is adapted to transmit information concerning the configured duplex mode of the relay node, to the base station.

According to a third aspect, the object is achieved by a method in a base station. The method aims at adapting the communication mode according to a selection of communication mode made by a relay node. The relay node is configured to communicate with the base station via a donor antenna over a first link. Further, the relay node is also configured to communicate with a user equipment via a coverage antenna over a second link. The method comprises receiving information concerning the configured duplex mode of the relay node in a wireless transmission from the relay node. Also, the method comprises configuring the base station to communicate in full duplex mode with the relay node, if the received information reveals that the relay node is configured in full duplex mode. Otherwise the base station is configured to communicate in half duplex mode with the relay node, if the received information reveals that the relay node is configured in half duplex mode.

According to a fourth aspect, the object is achieved by an arrangement within a base station. The base station is configured for adapting the communication mode according to a selection of communication mode made by a relay node. The relay node is configured to communicate with the base station via a donor antenna over a first link. Also, the relay node is configured to communicate with a user equipment via a coverage antenna over a second link. The base station comprises a receiver. The receiver is adapted to receive information concerning the configured duplex mode of the relay node in a wireless transmission from the relay node. Further, the base station comprises a configuration unit. The configuration unit is adapted to configure the base station to communicate in full duplex mode with the relay node, if the received information reveals that the relay node is configured in full duplex mode.

Otherwise the configuration unit is adapted to configure the base station to communicate in half duplex mode with the relay node, if the received information reveals that the relay node is configured in half duplex mode.

Compared with the existing solutions, the proposed solution has the following advantages.

By providing a relay which is able to switch between full duplex mode and half duplex mode, based on the isolation between relay donor antenna and relay coverage antenna, a relay with improved performance in some well-isolated scenario compared with a basic 3GPP type-I relay is provided.

No strict requirements on equipments and network deployment are made according to some embodiments. Improved performance is achieved by exploring off-the-peg isolation in some scenarios.

Embodiments of the present method and relay are feasible for use within both Time Division Duplex (TDD) and/or Frequency Division Duplex (FDD) systems.

Embodiments of the present method and relay may implemented such that 3GPP-compliant type-I relay in half duplex mode is the basic functionality, while full-duplex mode provides added value.

Thereby, thanks to the present method, transmission in full duplex mode in the relay node is possible, which allows communication in both directions, uplink and downlink, simultaneously. There are several benefits to using full-duplex over half-duplex. First, time is not wasted, since no frames need to be retransmitted, as there are no collisions. Second, the full data capacity is available in both directions because the send and receive functions are separated. Third, nodes do not have to wait until other nodes complete their transmission, since transmission is possible only in one direction at the time for each pair of sender/receiver.

Thus an improved performance within a wireless communication network is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The present solution is defined as a method and arrangement in a relay node and a method and arrangement in a base station, which may be put into practice in the embodiments described below. The present solution may, however, be embodied in many different forms and should not be construed as limited to the embodiments set forth herein. There is no intent to limit the present methods and arrangements to any of the particular forms disclosed, but on the contrary, the present methods and arrangements are to cover all modifications, equivalents, and alternatives falling within the scope of the present solution as defined by the claims.

The present solution may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

Figure 1A:
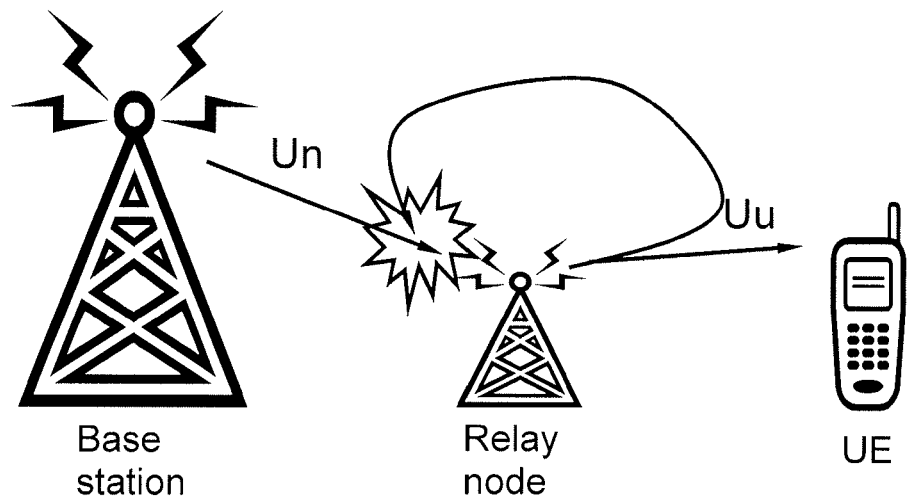
FIG. 1A is a schematic block diagram illustrating an example of interference of a relay node, according to prior art.
Figure 1B:
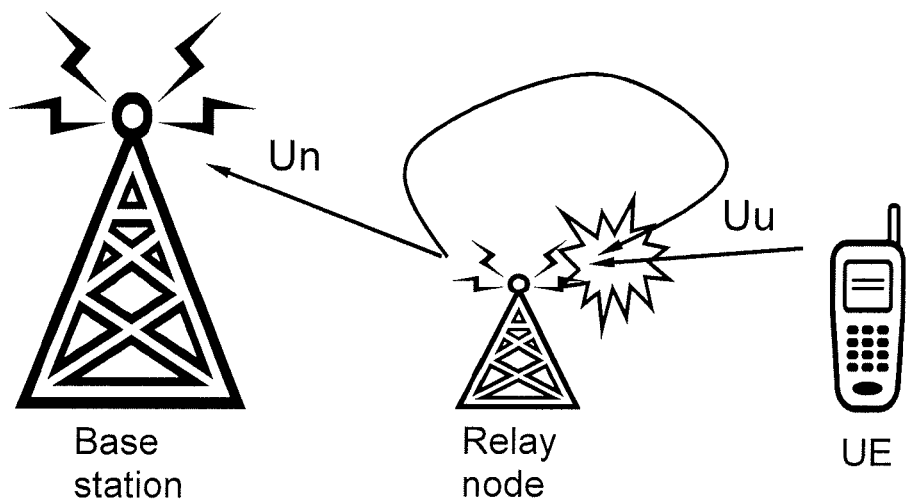
FIG. 1B is a schematic block diagram illustrating an example of interference of a relay node, according to prior art.
Figure 2:
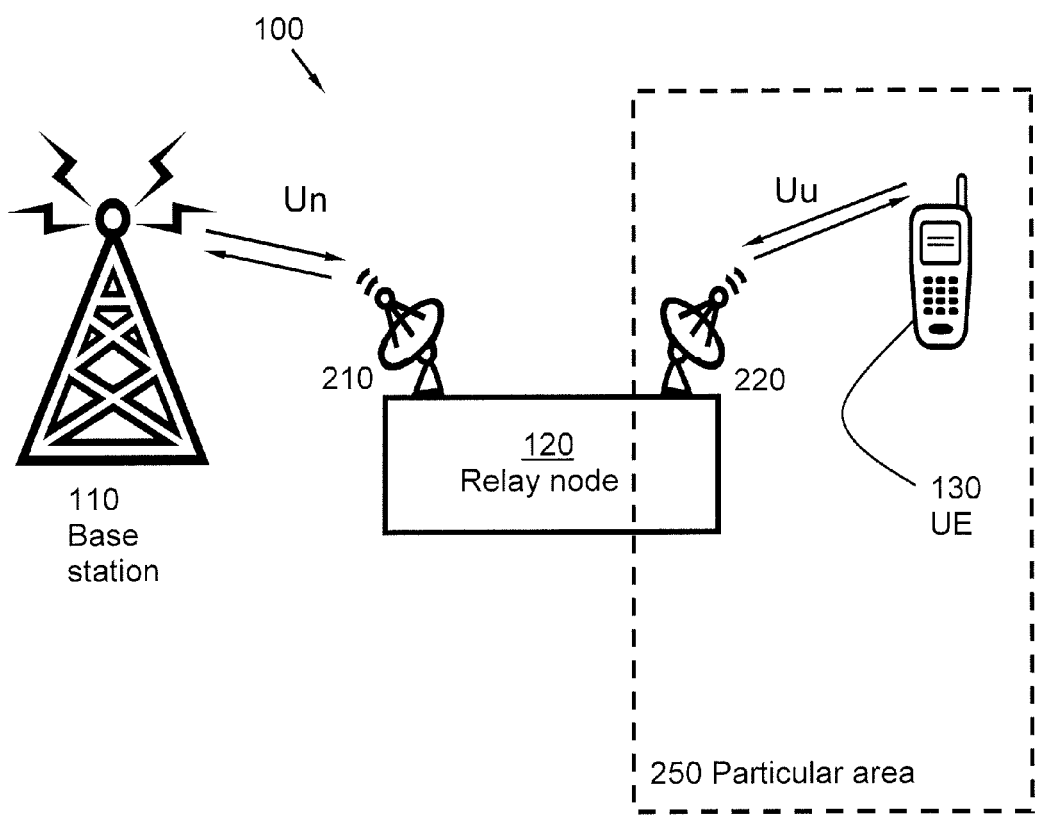
FIG. 2 is a block diagram illustrating a wireless communication network.

FIG. 2 is a schematic illustration over a wireless communication network 100. The wireless communication network 100 comprises at least one base station 110 and a relay node 120. The wireless communication network 100 further comprises a plurality of user equipment units 130. The base station 110 may send and receive wireless signals to and from the user equipment 130 via the relay node 120.

Although only one base station 110, one relay node 120 and one user equipment 130 are depicted in FIG. 2, it is to be understood that another configuration of base station transceivers, relay nodes and user equipment units, respectively, may be comprised within the wireless communication network 100.

Further, the base station 110 may be referred to as e.g. a Remote Radio Unit, an access point, a Node B, an evolved Node B (eNode B or eNB) and/or a base transceiver station, Access Point Base Station, base station router, etc depending e.g. of the radio access technology and terminology used. Also, the terminology "donor eNB" may be used for the base station 110, in relation to the relay node 120.

The wireless communication network 100 allows transmission/reception of information using a plurality of wireless nodes 110, 120, 130. In general, in the wireless network 100, wireless relay nodes 120 may be installed between base stations 110, which are spaced apart from each other e.g. beyond each communicable range and which may be fixedly installed, or fixed nodes may be wire-connected to each other, thereby enabling long distance communication between the nodes situated at locations spaced apart from each other. Relay nodes 120 may further be installed in order to reach locations where the radio propagation conditions are such that it is difficult to provide a radio service from the base station 110, e.g. in a particular area 250 such as an isolated compartment i.e. inside a building, in a tunnel, in a bunker, in a shelter, in the subway, or similar situation where radio shadow may appear or be experienced by the user equipment 130.

The relay node 120 may comprise radio communication ability, information recording ability, and an information conveying ability, according to some embodiments.

Further, the relay node 120 may comprise, be associated with, or be connected to a donor antenna 210 and a coverage antenna 220. The donor antenna 210 may be configured to receive and transmit radio signals to/from the base station 110 while the coverage antenna 220 may be configured to receive and transmit radio signals to/from the user equipment 130.

The information conveying section may transmit information between the radio communication section and the information recording section and determine a destination of the information. The relay node 120 may receive information from the base station 110 through the radio communication section, and store the received information in the information recording section through the information conveying section. Then, the relay node 120 may transmit the information stored in the information recording section to the user equipment 130 through the radio communication section.

In some embodiments, the user equipment 130 may be represented by a wireless communication device, a wireless communication terminal, a mobile cellular telephone, a Personal Communications Systems terminal, a mobile station (MS), a Personal Digital Assistant (PDA), a laptop, computer or any other kind of device configured for managing radio resources.

The wireless communication network 100 may be based on technologies such as e.g. LTE, such as e.g. LTE Rel-8, LTE Rel-9, LTE Rel-10 and/or LTE-Advanced, Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS), Wireless Local Area Networks (WLAN), such as Wireless Fidelity (WiFi) and Worldwide Interoperability for Microwave Access (WiMAX), Bluetooth or according to any other wireless communication technology etc, just to mention some few arbitrary and none limiting examples.

The wireless communication system 100 may be configured to operate according to the Time Division Duplex (TDD) and/or the Frequency Division Duplex (FDD) principle.

The user equipment 130 may further communicate with other user equipment units not shown in FIG. 2, via the base station 110 and/or the relay node 120 comprised within the wireless communication network 100.

The expression "downlink" (DL) is in the present context used to specify the transmission from the base station 110, via the relay node 120 to the user equipment 130, while the expression "uplink" (UL) is used to denote the transmission from the user equipment 130 to the base station 110, via the relay node 120.

The base station 110 is configured to communicate control signals with the relay node 120. The relay node 120 is configured to relay a data transmission between the base station 110 and the user equipment 130.

In some scenarios, the isolation between relay donor antenna 210 and relay coverage antenna 220 may be large. Some examples of such scenarios may be e.g. an indoor application where the outdoor donor antenna 210 and indoor coverage antenna 220 are separated, such that the coverage antenna 220 is situated within a particular area 250, i.e. inside a building. Such situation may further occur for a subway application where the donor antenna 210 may be situated above the ground while the coverage antenna 220 may be situated underground thus forming a particular area 250. Another example may be a tunnel application, wherein the donor antenna 210 may be situated outside of the tunnel while coverage antenna 220 may be situated inside the tunnel, which tunnel may form a particular area 250.

When the terms "isolation" and "isolated compartment" are used in the present context, it is isolation of radio waves, i.e. electro magnetic radiation that is concerned. Such isolation may be provided by e.g. a building, a subway, a tunnel, a cave, a cavity, a basement, a cellar, a bunker, a vehicle or similar, but may also by e.g. a wall, a mountain or an obstacle made from e.g. radio wave absorbing materials, a radio wave absorber and/or a radio wave anechoic chamber etc.

In such scenarios, the interference between donor antenna 210 and coverage antenna 220 may be small or even negligible, which makes resource partitioning between Un and Uu i.e. transmission in half duplex mode, unnecessary.

According to embodiments of the present method is the relay node 120 configured to switch between full duplex mode and half duplex mode, based on the isolation between the relay donor antenna 210 and the relay coverage antenna 220. The relay node 120 may be a self-configurable relay 120 according to some embodiments, adapted to switch between full duplex mode and half duplex mode. In start-up phase, the relay node 120 may measure the isolation between its donor antenna 210 and coverage antenna 220. If the isolation is large enough to support full-duplex mode, the relay 120 works in full-duplex mode. Otherwise the relay 120 works in half-duplex mode, according to 3GPP definition. Signalling between relay 120 and base station 110 is also defined, based on which base station 110 knows the mode of the relay 120 and can therefore schedule the relay 120 properly. During operating mode, the relay 120 may still measure the isolation, according to some embodiments. If isolation changes above/below a certain threshold, change in duplex mode may be triggered. Further, according to some embodiments, the relay node 120 may communicate in one duplex mode in the uplink and another duplex mode in the downlink, based on the radio wave isolation between the relay donor antenna 210 and the relay coverage antenna 220.

Figure 3:
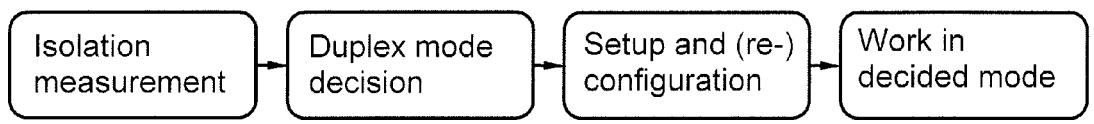
FIG. 3 is a schematic flow chart illustrating an embodiment of the present method.

In FIG. 3 is a schematic block diagram illustrating an overview of an embodiment of the present method illustrated.

As illustrated in FIG. 3, the isolation between the coverage antenna 220 and the donor antenna 210 associated with the relay 120 is measured. Based on the measured isolation value a decision is made whether it is possible to work in full duplex mode or not. The decision is signalled to the donor base station 110 to make sure that the base station 110 knows the duplex mode of the relay 120 and thus schedule the relay 120 properly. After handshaking between the base station 110 and the relay 120, the relay 120 can work in the decided mode, i.e. full duplex mode or half-duplex mode.

Figure 4A:
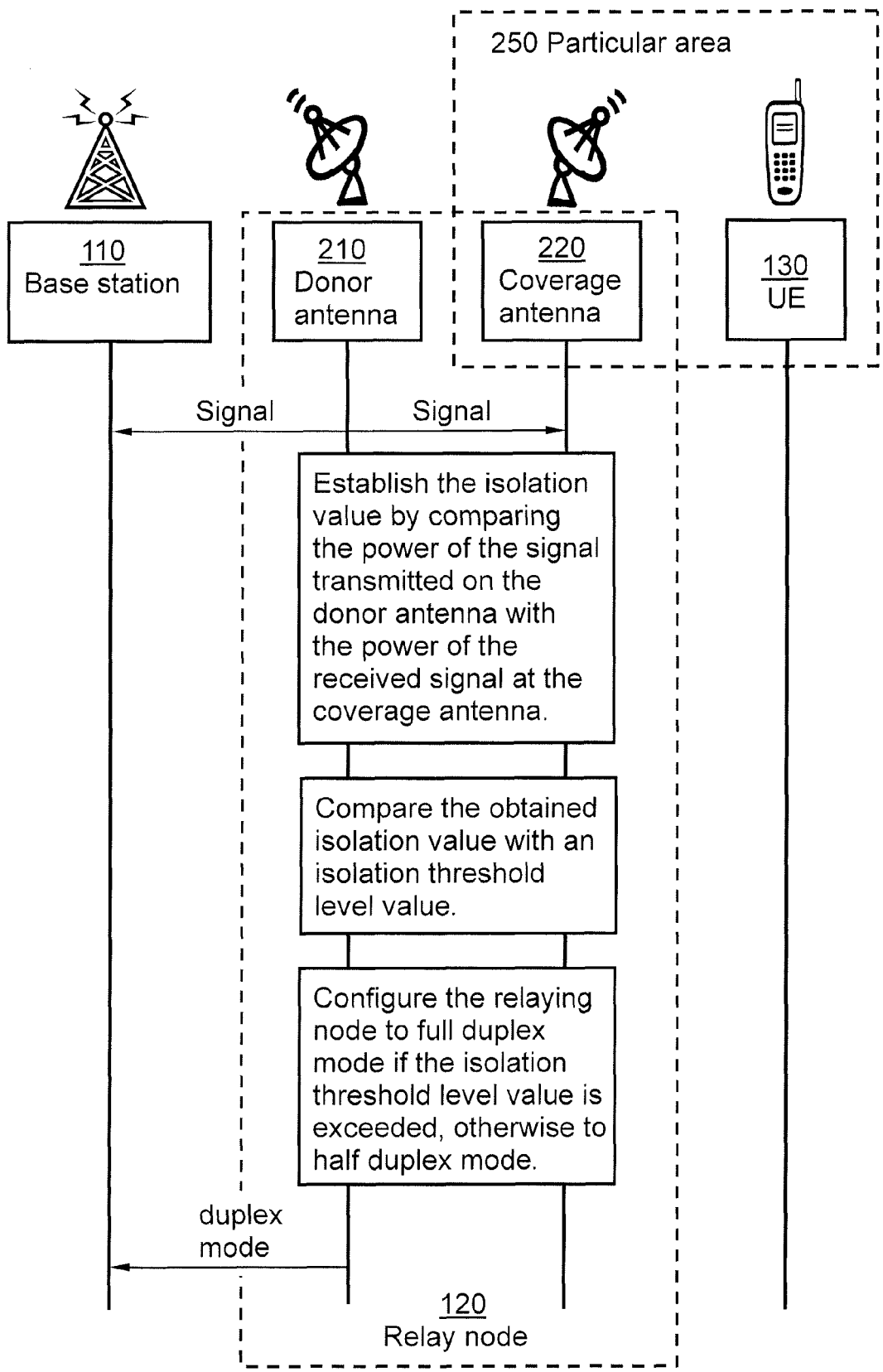
FIG. 4A is a combined flow chart and block diagram illustrating an embodiment of the present method.

FIG. 4A is a schematic block diagram illustrating an embodiment of the present method.

The isolation may be measured donor-to-coverage, resulting in a donor-to-coverage isolation (D2CI) as illustrated in FIG. 4A. It may also be measured coverage-to-donor, resulting in coverage-to-donor isolation (C2DI), as will be discussed in association with FIG. 5.

In the illustrated embodiment, the relay 120 measures the donor-to-coverage isolation (D2CI) during its start-up phase when power on is performed as illustrated in FIG. 4A. After power on, the relay 120 may first access its donor base station 110 similar to a user equipment. During this period of time, some signals, e.g. signal for random access, acknowledgement of correctly received information, may be sent from the relay donor antenna 210 to the base station 110. When the donor antenna 210 is transmitting, the coverage antenna 220 may sniff the signal. An isolation value D2CI can then be obtained by comparing the power of the transmitted signal and the received signal.

The obtained isolation value may then be compared with an isolation threshold level value.

The threshold to switch between half duplex mode and full duplex mode for uplink and/or both uplink and downlink may be decided based on the maximum affordable interference at the coverage antenna 220 and the transmission power of the donor antenna 210. The decision may be made at the relay 120, based on some preconfigured values received from the base station 110, or it may alternatively be made at the base station 110, according to some embodiments. It is also possible that the decision is made at some Operation and Maintenance (O&M) node and sent to the base station 110 and the relay 120.

Thus, if the obtained isolation value exceeds the isolation threshold level value, the relay node 120 may be configured to communicate in full duplex mode in the uplink. Alternatively, may the relay node 120 be configured to communicate in full duplex mode both in the uplink and the downlink, if the obtained isolation value exceeds the isolation threshold level value.

Otherwise, if the obtained isolation value does not exceed the isolation threshold level value, the relay node 120 may be configured to communicate in half duplex mode in the uplink. Alternatively, may the relay node 120 be configured to communicate in half duplex mode both in the uplink and downlink if the obtained isolation value does not exceed the isolation threshold level value.

Information concerning the configured duplex mode of the relaying node 120 is then transmitted to the base station 110.

Figure 4B:
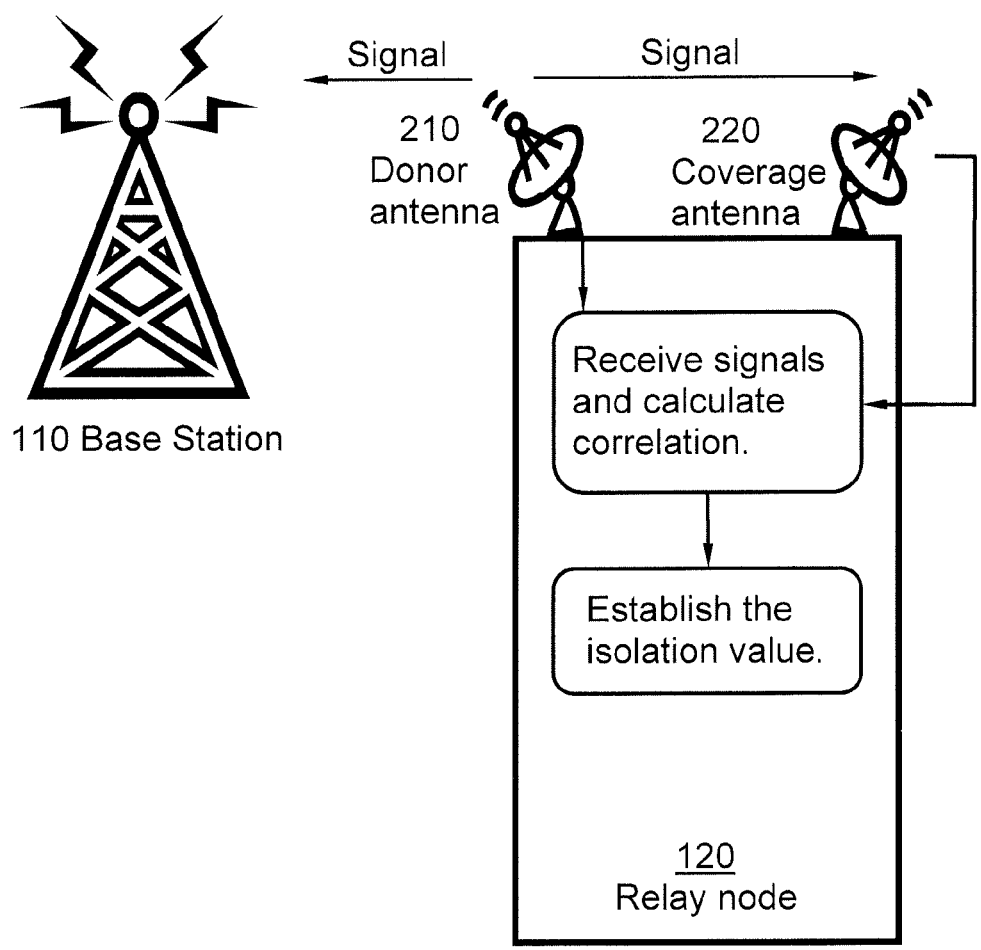
FIG. 4B is a combined flow chart and block diagram illustrating an embodiment of the present method.

FIG. 4B is a schematic block diagram illustrating an embodiment of the present method.

It is possible when performing the method as illustrated in FIG. 4A that there are some user equipment 130 transmitting signals towards base station 110 during coverage antenna sniffing phase, which makes the received power at the coverage antenna 220 not only comes from the donor antenna 210. Correlation-based detection as illustrated in FIG. 4B may be applied to solve this problem. As the relay 120 knows what it is transmitting on the donor antenna 210, it may correlate the received signal at the coverage antenna 220 with the transmitted signal. By doing this, signals other than what has been transmitted from the donor antenna 210 can be nulled out, according to some embodiments.

Figure 5:
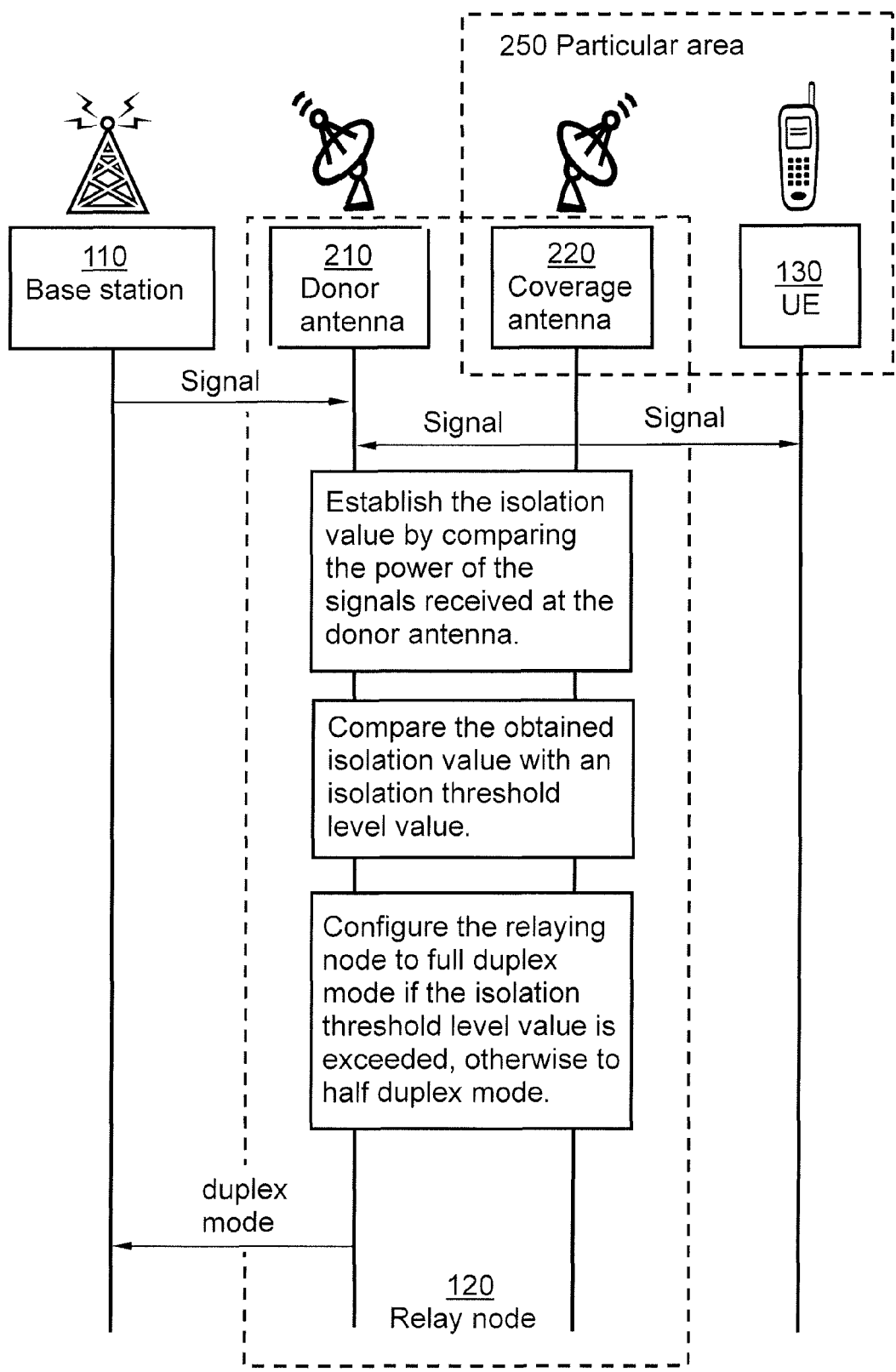
FIG. 5 is a combined flow chart and block diagram illustrating an embodiment of the present method.

FIG. 5 is a schematic block diagram illustrating an embodiment of the present method.

In FIG. 5 is the detection of coverage-to-donor isolation (C2DI) illustrated. During start up i.e. before serving its user equipment 130, the relay 120 may also measure received signal power (P0) from its donor base station 110. After the relay 120 has accessed its donor base station 110, it starts to signal in its coverage area via its coverage antenna 220. Such signalling may comprise e.g. Cell-specific Reference Symbols (CRS), Broadcast CHannel (BCH), Primary Synchronization Signal (PSS), Secondary Synchronization Signal (SSS), Sounding Reference Signal (SRS) etc. When the coverage antenna 220 is transmitting, the donor antenna 210 may sniff the signal and measure the received signal power (P1), which may comprise signals from the coverage antenna 220 and the donor base station 110. The isolation value C2DI may then be obtained by comparing the power of the transmitted signal and the received signal, with reduction made for the signal transmitted from the base station 110, i.e. P1-P0. Correlation-based detection may be applied also here, according to some embodiments.

The isolation value in the uplink and downlink, respectively, i.e. D2C1 and C2DI may be measured separately according to some embodiments, as in a Multiple Input Multiple Output (MIMO) relay system the antenna weights for transmitting and receiving may not be the same for the antennas 210, 220, which may result in a difference between D2CI and C2DI.

In addition to duplex mode setup during start up, the relay 120 may measure the isolation periodically during the operation time. If the isolation value changes dramatically, the duplex mode could be re-configured accordingly.

The obtained isolation value may then be compared with an isolation threshold level value.

The threshold to switch between half duplex mode and full duplex mode for downlink may be decided based on the maximum affordable interference at the donor antenna 210 and the transmission power of the coverage antenna 220 according to some embodiments. The decision may be made at the relay 120, based on some preconfigured values received from the base station 110, or it may alternatively be made at the base station 110, according to some embodiments. It is even possible that the decision is made at some O&M node and sent to the base station 110 and the relay 120.

Thus, if the obtained isolation value exceeds the isolation threshold level value, the relay node 120 may be configured to communicate in full duplex mode in the uplink. Alternatively, may the relay node 120 be configured to communicate in full duplex mode both in the uplink and the downlink, if the obtained isolation value exceeds the isolation threshold level value.

Otherwise, if the obtained isolation value does not exceed the isolation threshold level value, the relay node 120 may be configured to communicate in half duplex mode in the uplink. Alternatively, may the relay node 120 be configured to communicate in half duplex mode both in the uplink and downlink if the obtained isolation value does not exceed the isolation threshold level value.

Information concerning the configured duplex mode of the relaying node 120 is then transmitted to the base station 110.

Further, also the duplex mode for uplink and downlink may be decided separately according to some embodiments.

Optionally different isolation threshold level values to switch between half duplex mode and full duplex mode may be applied for uplink ($T_{UL}$) and downlink ($T_{DL}$), as has been mentioned already.

With these two isolation threshold level values $T_{UL}$ and $T_{DL}$, applying the two different optional isolation values in the uplink and downlink, respectively, i.e. D2CI and C2DI.

TABLE 1

| Relay duplex mode | D2CI requirement | C2DI requirement |
|---|---|---|
| UL full + DL full | D2CI > $T_{UL}$ | C2DI > $T_{DL}$ |
| UL full + DL half | D2CI > $T_{UL}$ | C2DI <= $T_{DL}$ |
| UL half + DL full | D2CI <= $T_{UL}$ | C2DI > $T_{DL}$ |
| UL half + DL half | D2CI <= $T_{UL}$ | C2DI <= $T_{DL}$ |

The receiver type may also affect the isolation threshold level values to some extend. As what transmits from the relay 120 is known at the relay receiver side, interference cancellation scheme can be applied to cancel the known interference. If such interference cancellation schemes are used, the relay 120 can afford larger interference, and the isolation threshold level value for entering full-duplex mode may be reduced, according to some embodiments.

When the relay node 120 is starting up, the relay node 120 may make itself known to the network 100. Depending on the architecture, the relay 120 may be transparent or known by the base station 110 and the O&M system.

In case the in-band relay 120 applies half duplex, the time division multiplexing scheme between access and backhaul link with certain advantage may be known at both donor base station 110 and relay 120 since the relay 120 has an advantage in knowing when it is supposed to receive, or transmit, from/to the base station 110.

Hence, the donor base station 110 is to be aware of the configured duplex scheme in the relay 120. One possible alternative is that the donor base station 110 and the relay node 120 decide upon a suitable configuration, considering load, link quality etc. in a distributed fashion. Another approach may be that the O&M system is made aware of the measurement, decides on the duplex schemes and thereafter configures the relay 120 and donor base station 110. A third alternative may be that an on-site engineer is responsible for deciding on the duplex scheme. In this latter case, the relay node 120 and the donor base station 110 may be made aware of the duplex scheme either by direct configuration by the engineer (the donor base station 110 may alternatively be indirectly configured using a distributed scheme as outlined above) or indirectly by the O&M system (which may be made aware of the duplex scheme by the optional on-site engineer), according to different embodiments. It is to be noted that the optional engineer on its hand may rely on the above proposed measurements according to some embodiments, but the present methods are not limited thereto.

It may also in certain scenarios be an advantage that the network 100 is able to control the behaviour of the relay node 120, to ensure robustness, e.g. regarding changes in the propagation environment, and controllability. Therefore, it might be beneficial if the relay behaviour may be monitored and that the isolation threshold level value/s, stating the requirement of isolation, is/are possible to re-configure from the network 100, depending on scenario. The monitoring may be done in many different ways, e.g. by polling the relay 120 for an updated isolation measurement report or periodical reporting according to network configured intervals. This monitoring may be performed either by the O&M system or by the donor base station 110. In the first case the relay re-configuration may in that case be done by O&M signalling, whereas in the latter case the signalling may use some existing, or new, radio interface protocol. One such candidate may be to use Radio Resource Control (RRC) signalling, according to some embodiments.

In half duplex mode the relay 120 may operate according to 3GPP definition. In downlink it may configure at least one of its subframes to be a Multicast Broadcast Single Frequency Network (MBSFN) subframe, and receive base station transmissions in such subframe. In uplink, it schedules its subordinate user equipment 130 only in some of the subframes. For the rest uplink subframes, it may be possible for the relay 120 to transmit towards the base station 110, according to some embodiments.

In full duplex mode the relay node 120 may work like a combination of a normal user equipment and a normal base station 110. The relay 120 may schedule its subordinate user equipment 130 in any subframe, and the relay 120 may be scheduled by its donor base station 110 in any subframe, according to some embodiments.

If the relay node 120 is working in half duplex mode, the base station 110 may treat this relay 120 as a 3GPP type-I relay, and work according to 3GPP definition. For example, the base station 110 may only transmit to this relay 120 during the relay's MBSFN subframe, and only receive from the relay 120 during some pre-defined subframes, according to some embodiments.

If the relay node 120 is working in full duplex mode, the base station 110 just treats this relay 120 like a normal user equipment 130. The base station 110 may transmit to, or receive from, this relay 120 in any subframes, according to some embodiments.

Figure 6:
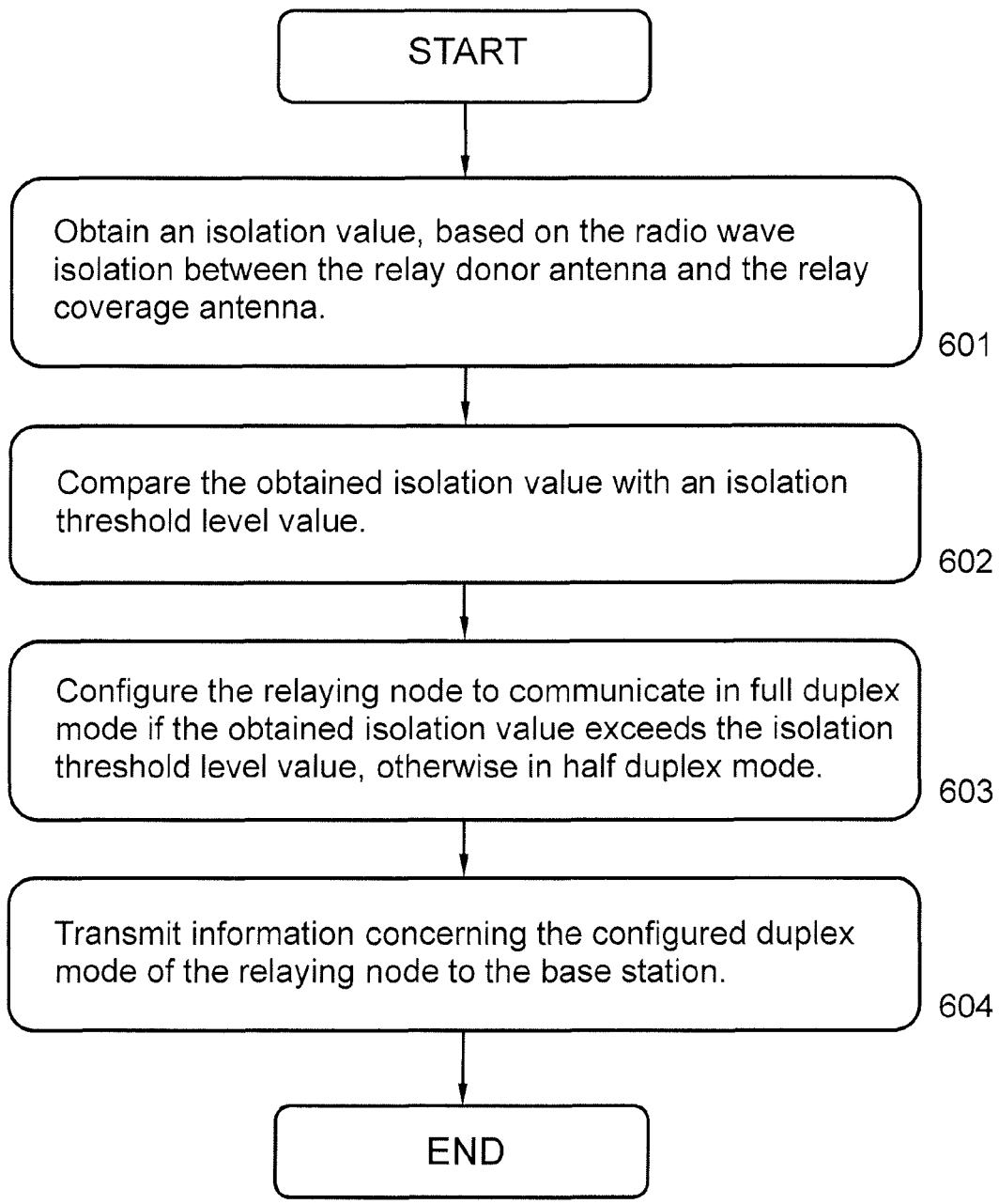
FIG. 6 is a schematic flow chart illustrating embodiments of a method in a relay node.

FIG. 6 is a schematic block diagram illustrating an example of a method in a relay node 120 for selecting communication mode. The communication mode to be selected may be full duplex mode or half duplex mode. The relay node 120 is configured to communicate with a base station 110 via a donor antenna 210 over a first link Un. Further, the relay node 120 is configured to communicate with a user equipment 130 via a coverage antenna 220 over a second link Uu. The base station 110, the relay node 120 and the user equipment 130 may be comprised in a wireless communication network 100.

Thus the donor antenna 210 and/or the coverage antenna 220 may be comprised within the relay node 120 according to some embodiments. However, according to some embodiments may the relay node 120 be connected to the donor antenna 210 and/or the coverage antenna 220, e.g. by a wired connection.

The relay node 120 may be adapted to communicate in different duplex modes with the base station 110 over the first link Un and the user equipment 130 over the second link Uu, respectively, based on the use of different isolation threshold level values to be used when communicating respectively over the first link Un and the second link Uu, according to some embodiments.

The present method may be performed during start-up of the relay node 120 and/or periodically during the operation time of the relay node 120, according to some embodiments.

The method may comprise a number of actions 601-604, in order to correctly select communication mode. The actions may be performed in a somewhat different order than the enumeration indicates, according to different embodiments.

Action 601

An isolation value, based on the radio wave isolation between the relay donor antenna 210 and the relay coverage antenna 220 is obtained.

The action of obtaining the isolation value may according to some embodiments comprise transmitting a signal from the relay donor antenna 210, receiving the transmitted signal at the relay coverage antenna 220, and establishing the isolation value by comparing the power of the signal transmitted from the relay donor antenna 210 with the power of the received signal at the relay coverage antenna 220.

However, the action of obtaining the isolation value may according to some embodiments comprise correlating the received signal at the relay coverage antenna 220 with the signal transmitted from the relay donor antenna 210, before establishing the isolation value.

Further, according to some embodiments, the action of obtaining the isolation value may comprise measuring the received signal power of a signal received from the base station 110 at the relay donor antenna 210, measuring the received signal power of a signal received from the relay coverage antenna 220 at the relay donor antenna 210, and establishing the isolation value by comparing the received signal power of the signal received from the base station 110 at the relay donor antenna 210 with the received signal power of the signal received from the relay coverage antenna 220 at the relay donor antenna 210.

The action of obtaining the isolation value may according to some embodiments comprise estimating the interference between the signals transmitted at the relay donor antenna 210 and at the relay coverage antenna 220.

Action 602

The obtained isolation value is compared with an isolation threshold level value.

The isolation threshold level value may optionally be based on either the maximum affordable interference at the donor antenna 210 and the transmission power of the coverage antenna 220, or the maximum affordable interference at the coverage antenna 220 and the transmission power of the donor antenna 210, according to some embodiments.

The isolation threshold level value may optionally be predetermined, according to some embodiments. However, the isolation threshold level value may be distantly configurable and/or reconfigurable from another network node than the relay node 120. The network node may optionally be the base station 110, an O&M node or another node within the wireless network 100. The network node may optionally even be the user equipment 130 of an engineer with authority to adjust the isolation threshold level value of the relay node 120, according to some embodiments.

Action 603

The relay node 120 is configured to communicate in full duplex mode if the obtained isolation value exceeds the isolation threshold level value, otherwise in half duplex mode. Thus the relay node 120 is configured to communicate in half duplex mode if the obtained isolation value does not exceed the isolation threshold level value.

According to some embodiments, the relay node 120 may be configured to communicate in full duplex mode in the uplink if the obtained uplink isolation value exceeds the uplink isolation threshold level value, otherwise in half duplex mode. Thus the relay node 120 may be configured to communicate in half duplex mode in the uplink if the obtained uplink isolation value does not exceed the uplink isolation threshold level value, according to some embodiments.

According to some embodiments, the relay node 120 may be configured to communicate in full duplex mode in the downlink if the obtained downlink isolation value exceeds the downlink isolation threshold level value, otherwise in half duplex mode. Thus the relay node 120 may be configured to communicate in half duplex mode in the downlink if the obtained downlink isolation value does not exceed the downlink isolation threshold level value, according to some embodiments.

Action 604

Information concerning the configured duplex mode of the relay node 120 is transmitted to the base station 110.

According to some embodiments the configured duplex modes of the relay node 120 in the uplink and in the downlink may be transmitted to the base station 110.

Figure 7:
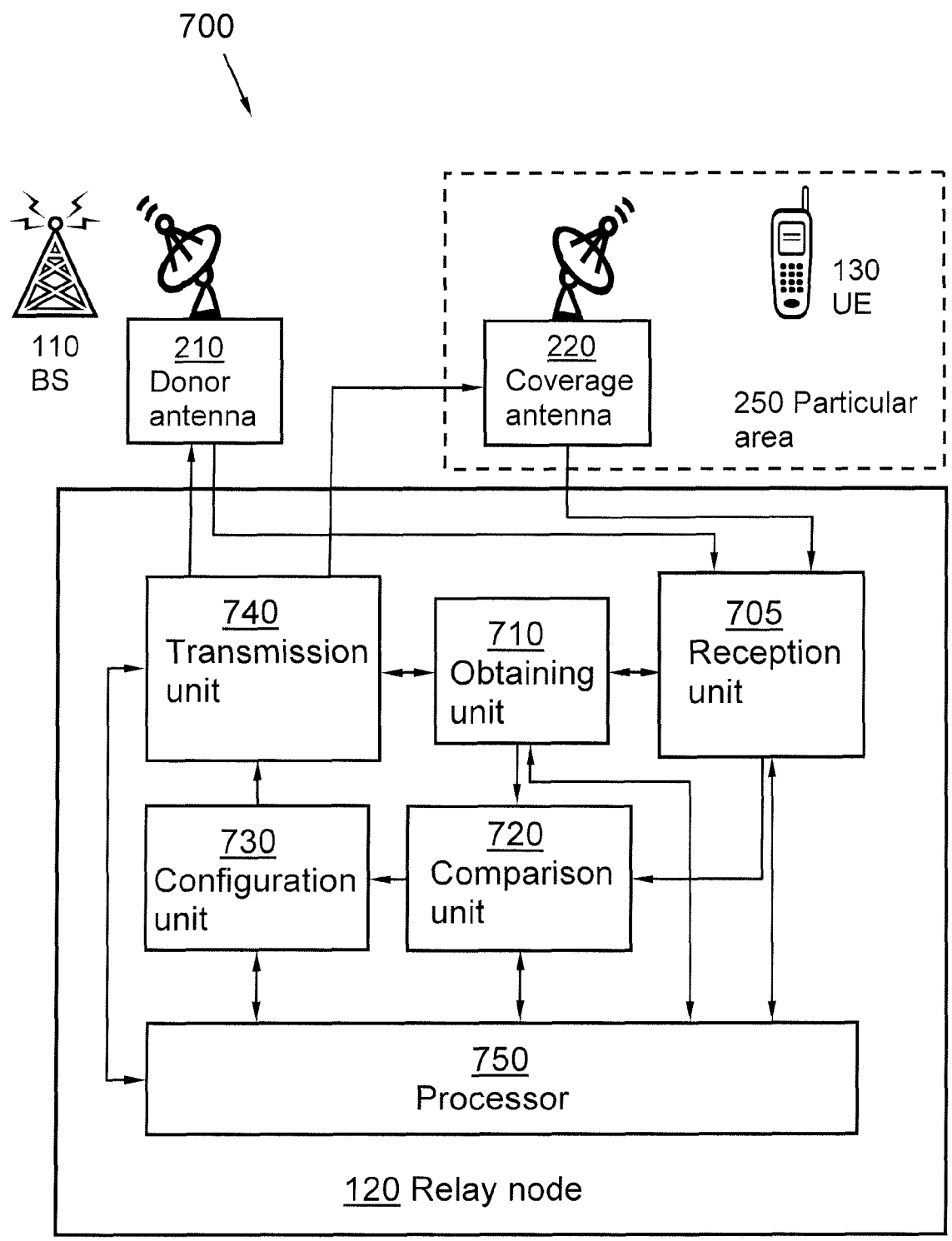
FIG. 7 is a block diagram illustrating embodiments of an arrangement in a relay node.

FIG. 7 is a block diagram illustrating embodiments of an arrangement 700 situated in a relay node 120. The arrangement 700 is configured to perform at least some of the actions 601-604 for selecting communication mode. The communication mode to be selected may be full duplex mode or half duplex mode. The relay node 120 is configured to communicate with a base station 110 via a donor antenna 210 over a first link Un. Further, the relay node 120 is configured to communicate with a user equipment 130 via a coverage antenna 220 over a second link Uu. The base station 110, the relay node 120 and the user equipment 130 may be comprised in a wireless communication network 100.

Thus the donor antenna 210 and/or the coverage antenna 220 may be comprised within the relay node 120 according to some embodiments. However, according to some embodiments may the relay node 120 be connected to the donor antenna 210 and/or the coverage antenna 220, e.g. by a wired connection, a cable or the like.

The relay node 120 may be adapted to communicate in different duplex modes with the base station 110 over the first link Un and the user equipment 130 over the second link Uu, respectively, based on the use of different isolation threshold level values to be used when communicating respectively over the first link Un and the second link Uu, according to some embodiments.

For the sake of clarity, any internal electronics of the arrangement 700, not completely indispensable for understanding the present method has been omitted from FIG. 7.

The arrangement 700 comprises an obtaining unit 710 adapted to obtain an isolation value, based on the radio wave isolation between the relay donor antenna 210 and the relay coverage antenna 220. Further, the arrangement 700 also comprises, in addition, a comparison unit 720 adapted to compare the obtained isolation value with an isolation threshold level value. Also, furthermore, the arrangement 700 additionally comprises a configuration unit 730 adapted to configure the relay node 120 to communicate in full duplex mode if the obtained isolation value exceeds the isolation threshold level value, otherwise in half duplex mode. Additionally, the arrangement 700 further comprises, also, a transmission unit 740 adapted to transmit information concerning the configured duplex mode of the relay node 120, to the base station 110.

The arrangement 700 may further optionally comprise, according to some embodiments, a reception unit 705 configured to receive signals from the base station 110 and/or the user equipment 130 via the donor antenna 210 and/or the coverage antenna 220, respectively.

The arrangement 700 may according to some embodiments comprise at least one processor 750. The processor 750 may be represented by e.g. a Central Processing Unit (CPU), a processing unit, a microprocessor, or other processing logic that may interpret and execute instructions. The processor 750 may perform all data processing functions for inputting, outputting, and processing of data including data buffering and device control functions, such as call processing control, user interface control, or the like.

It is to be noted that the described units 705-750 comprised within the arrangement 700 may be regarded as separate logical entities, but not with necessity as separate physical entities. Any, some or all of the units 705-750 may be comprised or co-arranged within the same physical unit. However, in order to facilitate the understanding of the functionality of the arrangement 700, the comprised units 705-750 are illustrated as separate physical units in FIG. 7.

The actions 601-604 to be performed in the relay node 120 may be implemented through one or more processors 750 in the relay node 120, together with computer program code for performing the functions of the present actions 601-604. Thus a computer program product, comprising instructions for performing the actions 601-604 in the relay node 120 may perform the method for selecting communication mode when being loaded into the processor 750.

The computer program product mentioned above may be provided for instance in the form of a data carrier carrying computer program code for performing at least some of the actions 601-604 according to the present solution when being loaded into the processor 750. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the relay node 120 remotely, e.g. over an Internet or an intranet connection.

Figure 8:
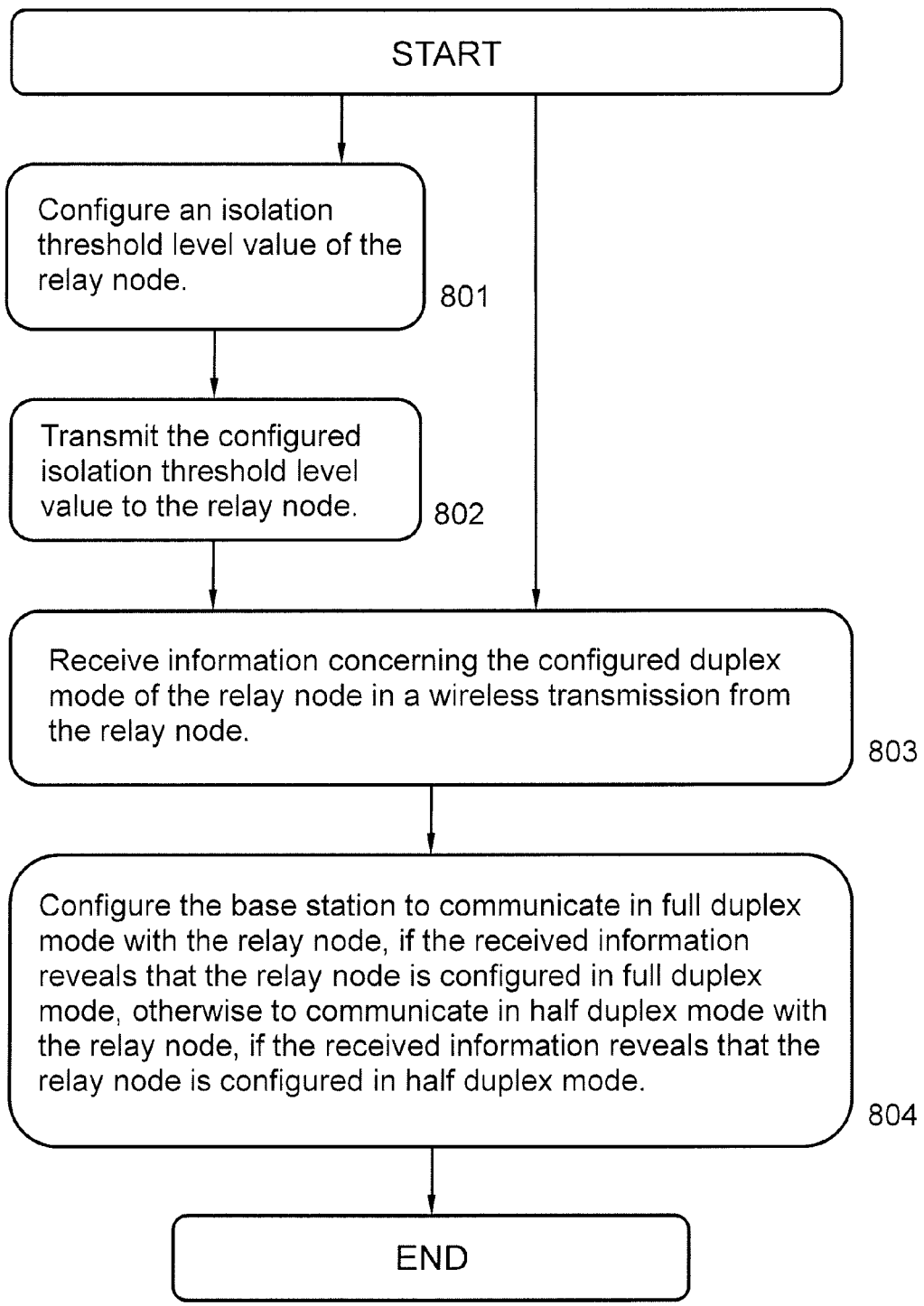
FIG. 8 is a schematic flow chart illustrating embodiments of a method in a base station.

FIG. 8 is a schematic block diagram illustrating an example of a method in a base station 110. The method aims at adapting the communication mode according to a selection of communication mode made by a relay node 120. The relay node 120 is configured to communicate with the base station 110 via a donor antenna 210 over a first link, Un. The relay node 120 is also configured to communicate with a user equipment 130 via a coverage antenna 220 over a second link Uu. The base station 110, the relay node 120 and the user equipment 130 may be comprised in a wireless communication network 100.

To appropriately adapt the communication mode according to a selection of communication mode made by the relay node 120, the method may comprise a number of actions 801-804.

It is however to be noted that some of the described actions are optional and only comprised within some embodiments. Further, it is to be noted that the actions 801-804 may be performed in a somewhat different chronological order and that some of them, e.g. action 802 and action 803, may be performed simultaneously or in a rearranged chronological order. Further, it is to be noted that some of the described actions are optional, e.g. action 803 and action 804. The method may comprise the following actions:

Action 801

This action is optional and may only be performed within some embodiments.

An isolation threshold level value of the relay node 120 may according to some embodiments be configured.

Action 802

This action is optional and may only be performed within some embodiments, in conjunction with the also optional action 801.

The configured isolation threshold level value may be transmitted to the relay node 120, according to some embodiments.

Action 803

Information concerning the configured duplex mode of the relay node 120 is received in a wireless transmission from the relay node 120.

Action 804

The base station 110 is configured to communicate in full duplex mode with the relay node 120, if the received information reveals that the relay node 120 is configured in full duplex mode.

Otherwise, the base station 110 is configured to communicate in half duplex mode with the relay node 120, if the received information reveals that the relay node 120 is configured in half duplex mode.

Figure 9:
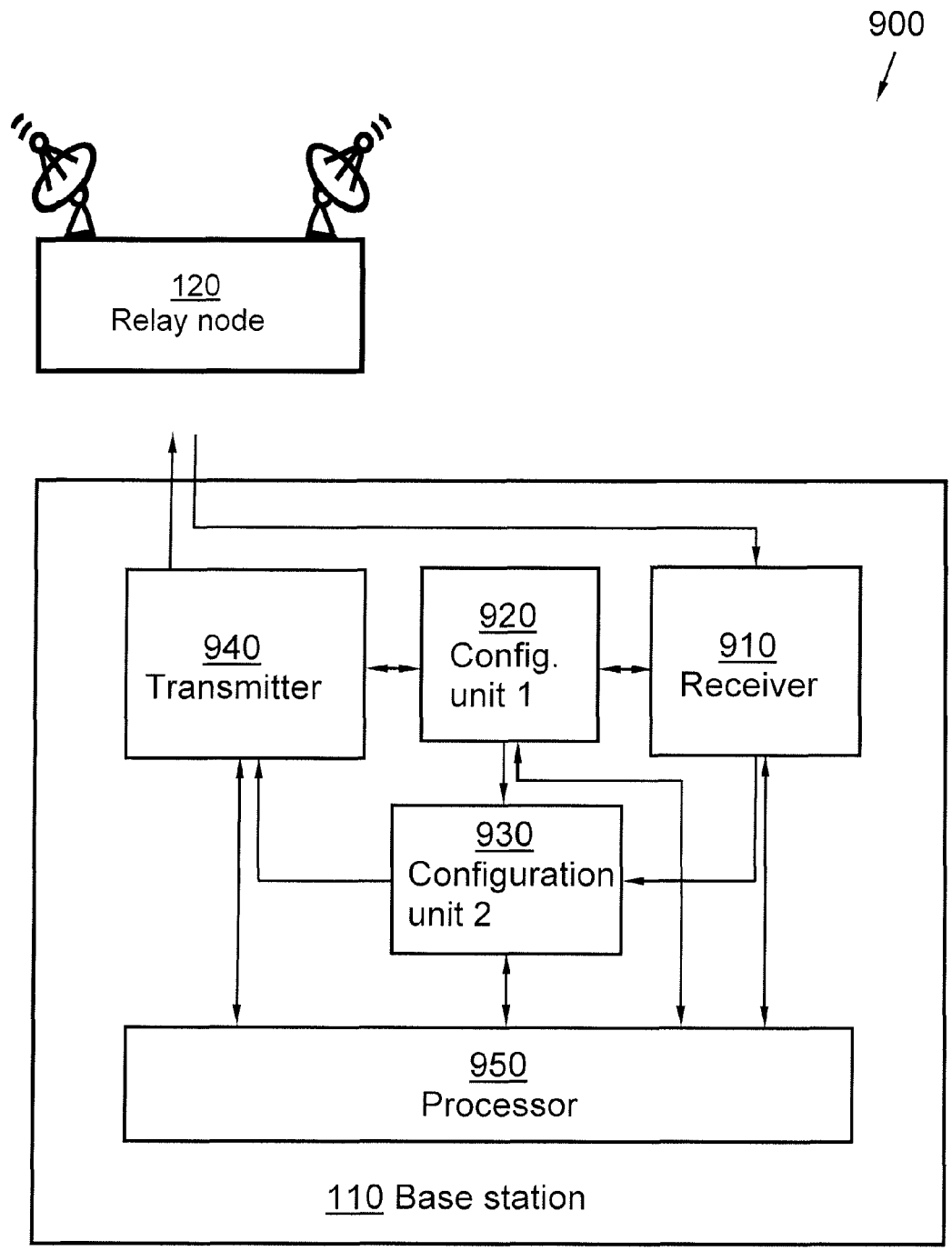
FIG. 9 is a block diagram illustrating embodiments of an arrangement in a base station.

FIG. 9 is a block diagram illustrating embodiments of an arrangement 900 situated in a base station 110. The arrangement 900 is configured to perform at least some of the actions 801-804 for adapting the communication mode according to a selection of communication mode made by a relay node 120. The relay node 120 is configured to communicate with the base station 110 via a donor antenna 210 over a first link Un. Also, the relay node 120 is further configured to communicate with a user equipment 130 via a coverage antenna 220 over a second link Uu.

The relay node 120 may be adapted to communicate in different duplex modes with the base station 110 over the first link Un and the user equipment 130 over the second link Uu, respectively, based on the use of different isolation threshold level values to be used when communicating respectively over the first link Un and the second link Uu, according to some embodiments. The base station 110, the relay node 120 and the user equipment 130 may be comprised in a wireless communication network 100.

For the sake of clarity, any internal electronics of the base station arrangement 900, not completely indispensable for understanding the present method has been omitted from FIG. 9.

The base station arrangement 900 comprises a receiver 910 adapted to obtain receive information concerning the configured duplex mode of the relay node 120 in a wireless transmission from the relay node 120. Furthermore, the arrangement 900 comprises a configuration unit 920 adapted to configure the base station 110 to communicate in full duplex mode with the relay node 120, if the received information reveals that the relay node 120 is configured in full duplex mode. Otherwise, the configuration unit 920 is adapted to communicate in half duplex mode with the relay node 120, if the received information reveals that the relay node 120 is configured in half duplex mode.

The base station arrangement 900 may further optionally comprise, according to some embodiments, a second configuration unit 930. The second configuration unit 930 may be adapted to configure an isolation threshold level value of the relay node 120, according to some embodiments. In addition, according to some optional embodiments may the arrangement 900 further comprise a transmitter 940. The optional transmitter 940 may be configured to transmit the configured isolation threshold level value to the relay node 120, according to some embodiments.

The base station arrangement 900 may according to some embodiments comprise at least one processor 950. The processor 950 may be represented by e.g. a Central Processing Unit (CPU), a processing unit, a microprocessor, or other processing logic that may interpret and execute instructions. The processor 950 may perform all data processing functions for inputting, outputting, and processing of data including data buffering and device control functions, such as call processing control, user interface control, or the like.

It is to be noted that the described units 910-950 comprised within the arrangement 900 may be regarded as separate logical entities, but not with necessity as separate physical entities. Any, some or all of the units 910-950 may be comprised or co-arranged within the same physical unit. However, in order to facilitate the understanding of the functionality of the base station arrangement 900, the comprised units 910-950 are illustrated as separate physical units in FIG. 9.

Any, all or some of the presently described actions 801-804 in the base station arrangement 900 may be implemented through one or more processors 950 in the base station 110, together with computer program code for performing the functions of the present actions 801-804. Thus a computer program product, comprising instructions for performing the actions 801-804 in the base station 110 may perform the method for selecting communication mode when being loaded into the processor 950.

The computer program product mentioned above may be provided for instance in the form of a data carrier carrying computer program code for performing at least some of the actions 801-804 according to the present solution when being loaded into the processor 950. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the base station 110 remotely, e.g. over an Internet or an intranet connection.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a relay node for selecting a communication mode, which relay node is configured to communicate with a base station via a donor antenna over a first link and to communicate with a user equipment via a coverage antenna over a second link, comprising:
 obtaining an isolation value, based on a radio wave isolation between the donor antenna and the coverage antenna;
 comparing the isolation value with a threshold level value;
 configuring the relay node to communicate in full duplex mode if the isolation value exceeds the threshold level value, and to communicate in half duplex mode if the isolation value does not exceed the threshold level value; and
 transmitting information concerning a configured duplex mode of the relay node to the base station.

2. The method of claim 1, wherein obtaining the isolation value comprises:
 transmitting a signal from the donor antenna;
 receiving the signal at the coverage antenna; and
 establishing the isolation value by comparing a power of the signal transmitted from the donor antenna with a power of the signal received at the coverage antenna.

3. The method of claim 2, wherein obtaining the isolation value further comprises:
 correlating the signal received at the coverage antenna with the signal transmitted from the donor antenna before establishing the isolation value.

4. The method of claim 1, wherein obtaining the isolation value comprises:
 measuring a first power of a first signal received from the base station at the donor antenna;
 measuring a second power of a second signal received from the coverage antenna at the donor antenna; and
 establishing the isolation value by comparing the first power with the second power.

5. The method of claim 1, wherein the threshold level value is based on either:
 a maximum affordable interference at the donor antenna and a transmission power of the coverage antenna; or
 a maximum affordable interference at the coverage antenna and a transmission power of the donor antenna.

6. The method of claim 1, wherein the threshold level value is configurable from a network node other than the relay node.

7. The method of claim 1, wherein the relay node is adapted to communicate in different duplex modes with the base station over the first link and with the user equipment over the second link, respectively, based on different threshold level values used when communicating over the first link and the second link.

8. The method of claim 1, wherein the method is performed during start-up of the relay node.

9. The method of claim 1, wherein the method is performed periodically during operation of the relay node.

10. An arrangement in a relay node for selecting a communication mode, the relay node being configured to communicate with a base station via a donor antenna over a first link and to communicate with a user equipment via a coverage antenna over a second link, the arrangement comprising:
 an obtaining unit configured to obtain an isolation value, based on a radio wave isolation between the donor antenna and the coverage antenna;
 a comparison unit configured to compare the isolation value with a threshold level value;
 a configuration unit configured to configure the relay node to communicate in full duplex mode if the isolation value exceeds the threshold level value, and to communicate in half duplex mode if the isolation value does not exceed the threshold level value; and
 a transmission unit configured to transmit, to the base station, information concerning a configured duplex mode of the relay node.

11. The arrangement of claim 10, wherein the obtaining unit is configured to obtain the isolation value by at least comparing a power of a signal transmitted from the donor antenna with a power of the signal received at the coverage antenna.

12. The arrangement of claim 11, wherein the obtaining unit is configured to obtain the isolation value by at least correlating the signal received at the coverage antenna with the signal transmitted from the donor antenna.

13. The arrangement of claim 11, wherein the obtaining unit is configured to obtain the isolation value by at least comparing a first power of a first signal received from the base station at the donor antenna with a second power of a second signal received from the coverage antenna at the donor antenna.

14. The arrangement of claim 10, wherein the threshold level value is based on either:
 a maximum affordable interference at the donor antenna and a transmission power of the coverage antenna; or
 a maximum affordable interference at the coverage antenna and a transmission power of the donor antenna.

15. A method in a base station for adapting its communication mode according to a communication mode of a relay node that is configured to communicate with the base station via a donor antenna over a first link and to communicate with a user equipment via a coverage antenna over a second link, the method comprising:
 receiving information concerning the communication mode of the relay node in a wireless transmission from the relay node, wherein the communication mode of the relay node includes full duplex mode if an isolation value exceeds a threshold level value and half duplex mode if the isolation value does not exceed the threshold level value, and the isolation value is based on a radio wave isolation between the donor antenna and the coverage antenna; and
 configuring the base station to communicate in full duplex mode with the relay node if the received information indicates that the communication mode of the relay node is full duplex mode, and to communicate in half duplex mode with the relay node if the received information indicates that the communication mode of the relay node is half duplex mode.

16. The method of claim 15, further comprising:
 configuring the threshold level value of the relay node, and transmitting the threshold level value to the relay node.

17. An arrangement in a base station for adapting its communication mode according to a communication mode of a relay node that is configured to communicate with the base station via a donor antenna over a first link and to communicate with a user equipment via a coverage antenna over a second link, the arrangement comprising:
a receiver configured to receive information concerning a configured duplex mode of the relay node in a wireless transmission from the relay node, wherein the communication mode of the relay node includes full duplex mode if an isolation value exceeds a threshold level value and half duplex mode if the isolation value does not exceed the threshold level value, and the isolation value is based on a radio wave isolation between the donor antenna and the coverage antenna; and a configuration unit configured to configure the base station to communicate in full duplex mode with the relay node if the information indicates that the relay node is configured in full duplex mode, and to communicate in half duplex mode with the relay node if the received information indicates that the relay node is configured in half duplex mode.

* * * * *

UNITED STATES PATENT AND TRADEMARK OFFICE
CERTIFICATE OF CORRECTION

PATENT NO.       : 8,787,214 B2                                         Page 1 of 1
APPLICATION NO.  : 13/123594
DATED            : July 22, 2014
INVENTOR(S)      : Gan et al.

It is certified that error appears in the above-identified patent and that said Letters Patent is hereby corrected as shown below:

On the Title Page, in item (73), under "Assignee", in Column 1, Line 1, delete "Ericcson" and insert -- Ericsson --, therefor.

In the Specification,

In Column 7, Line 58, delete "D2C1" and insert -- D2CI --, therefor.

In Column 8, Line 36, delete "$T_{DL}$," and insert -- $T_{DL}$, the duplex mode of the relay node 120 may optionally be decided according to Table 1, --, therefor.

Signed and Sealed this
Twenty-first Day of April, 2015

Michelle K. Lee
*Director of the United States Patent and Trademark Office*